United States Patent
Lee

(10) Patent No.: US 6,302,821 B1
(45) Date of Patent: Oct. 16, 2001

(54) POWER TRAIN OF AUTOMATIC TRANSMISSION

(75) Inventor: Hee-Yong Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/461,203

(22) Filed: Dec. 15, 1999

(30) Foreign Application Priority Data

Aug. 31, 1999 (KR) .................................................. 99 36420

(51) Int. Cl.[7] ....................................................... F16H 3/44
(52) U.S. Cl. .......................................... 475/284; 475/296
(58) Field of Search ..................................... 475/280, 282, 475/284, 296

(56) References Cited

U.S. PATENT DOCUMENTS

| | | | | |
|---|---|---|---|---|
| 4,602,525 | * | 7/1986 | Moroto et al. ................ | 475/296 X |
| 4,955,851 | * | 9/1990 | Arzoian et al. ............... | 475/280 X |
| 5,605,517 | * | 2/1997 | Sherman ....................... | 475/284 X |
| 5,707,312 | * | 1/1998 | Sefcik ........................... | 475/284 X |
| 5,816,972 | * | 10/1998 | Park ............................. | 475/296 X |
| 5,833,568 | * | 11/1998 | Park ............................. | 475/296 X |
| 5,853,345 | * | 12/1998 | Park ............................. | 475/296 X |
| 5,868,645 | * | 2/1999 | Beim et al. ................... | 475/296 X |
| 5,876,300 | * | 3/1999 | Moroto et al. ................ | 475/284 X |
| 6,110,069 | * | 8/2000 | Taniguchi et al. ............ | 475/284 X |

FOREIGN PATENT DOCUMENTS

| | | | | |
|---|---|---|---|---|
| 0371651 | * | 6/1990 | (EP) | ........................................ 475/280 |
| 2-129447 | * | 5/1990 | (JP) | ........................................ 475/280 |

* cited by examiner

Primary Examiner—Charles A Marmor
Assistant Examiner—Roger Pang
(74) Attorney, Agent, or Firm—Birch, Stewart, Kolasch & Birch, LLP

(57) ABSTRACT

A power train of an automatic transmission adapted to realize a shift stage comprising five forward speeds and one reverse speed by two simple planetary gear sets and seven friction elements to thereby enable compactness and lightness of the automatic transmission, the power train comprising: a combined planetary gear set provided by fixedly connecting a planetary carrier of a first signal pinion planetary gear set to a ring gear of a second single pinion planetary gear set, and by fixedly connecting a ring gear of a first single pinion planetary gear set to a planetary carrier of a second single pinion planetary gear set; three input units for causing an input to be variably initiated to any of three actuating elements out of various actuating elements at the combined planetary gear set; two output units for causing an output to be variably initiated from any of two actuating elements out of various actuating elements at the first single pinion planetary gear set; and two brakes actuating reaction forces between the respective gear sets and transmission housing.

4 Claims, 2 Drawing Sheets

FIG.2

| ACTUATION FRICTION ELEMENT / RANGE | INPUT FRICTION ELEMENT | | REACTION FORCE FRICTION ELEMENT | OUTPUT FRICTION ELEMENT | REMARKS |
|---|---|---|---|---|---|
| D1 | C1 | | B1 | C4 | |
| D2 | C1 | | B2 | C4 | |
| D3 | C1 | C2 | | C4 | 1:1 WHOLE COMBINED PLANETARY GEAR SET ROTATED |
| D4 | C2 | | B2 | C4 | |
| D5 | C2 | | B2 | C5 | |
| R | C3 | | B1 | C4 | |

POWER TRAIN OF AUTOMATIC TRANSMISSION

BACKGROUND OF THE INVENTION

1. Field of the Invention

The present invention relates to a power train of automatic transmission, and more particularly to a power train of automatic transmission adapted to initiate a shift stage of five forward speeds and one reverse speed with two planetary gear sets and seven friction elements for compactness, lightness and decreased power loss at three forward speeds.

2. Description of the Prior Art

Generally, an automatic transmission is mounted with a transmission control unit for automatically controlling a transmission ratio according to running speed of a vehicle and load change. The transmission control unit controls a plurality of friction elements mounted at a power train in operation or inoperation state to adjust revolution at an output terminal by selecting any one of three elements at the planetary gear sets (sun gear, ring gear and planetary carrier) as an input element and the others as reaction force element.

Actually, in order to design a power train for outputting a transmission ratio on four forward speeds and one reverse speed, a combined planetary gear set combining two simple planetary gear sets and at least five friction elements should be used.

Furthermore, the combined planetary gear set has planetary carriers directly connected for at least two different elements to be commonly used, or for a sun gear to be commonly used, or for planetary carrier and ring gear to be directly connected, or for the planetary carrier and the ring gear to be directly and commonly connected in direct structure, possessing four dependent actuating elements.

However, there is a problem in the power train thus described in that its engine performance cannot be fully utilized in a recent trend of high powered engine although a shift stage of four forward speeds and one reverse speed can be obtained. In other words, the automatic transmission cannot achieve good fuel consumption rate, power and driving performances. Lately, as a means for fully utilizing an engine performance at a high-powered engine, a power train having a shift stage of five forward speeds and one speed has been disclosed for multi-staging the transmission ratio. A power train according to the prior art proposed for a shift stage of five forward speeds and one reverse speed needs three simple planetary gear sets and six friction elements, or a power train that requires three simple planetary gear sets and seven friction elements has been provided.

SUMMARY OF THE INVENTION

However, there is a problem in the power train for providing a shift stage of five forward speeds and one reverse speed according to the prior art thus described in that the power train needs three simple planetary gear set and six friction elements, or three simple planetary gear sets and seven friction elements, thereby complication its structure and making it difficult to control.

Furthermore, there is another problem in that manufacturing cost thereof is increased to put a heavy financial burden to a vehicle purchaser and decrease sales competitiveness.

The present invention is disclosed to solve the aforementioned problems and it is an object of the present invention to provide a power train of automatic transmission adapted to initiate a shift stage of five forward speeds and one reverse speed with two simple planetary gear sets and seven friction elements. There is another object of the present invention to provide a power train of automatic transmission adapted to realize compactness and lightness and to decrease a power loss at three forward speeds.

In accordance with the objects of the present invention, there is provided a power train of automatic transmission, the power training comprising:

a combined planetary gear set provided by fixedly connecting a planetary carrier of a first signal pinion planetary gear set to a ring gear of a second single pinion planetary gear set, and by fixedly connecting a ring gear of a first single pinion planetary gear set to a planetary carrier of a second single pinion planetary gear set;

three input means for causing an input to be variably initiated to any of three actuating elements out of various actuating elements at the combined planetary gear set;

two output means for causing an output to be variably initiated from any of two actuating elements out of various actuating elements at the first single pinion planetary gear set; and two brakes actuating as reaction force.

According to the preferable embodiment, the input means comprises:

a first clutch for being mounted between a sun gear of first single pinion planetary gear set and an input axle to variably connect same;

a second clutch for being mounted between a planetary carrier of second single pinion planetary gear set and an input axle to variably connect same; and a third clutch for being mounted between a sun gear of second single pinion planetary gear set and an input axle to variably connect same.

Also, the output means comprises:

a fourth clutch for being mounted between a planetary carrier of first single pinion planetary gear set and a transfer drive gear to variably connect same; and a fifth clutch for being mounted between a sun gear of first single pinion planetary gear set and a transfer drive gear to variably connect same.

The brake comprises:

a first brake for selecting a ring gear as reaction force element between the ring gear of first single pinion planetary gear set and a transmission housing; and a second brake for selecting a sun gear as reaction force element between the sun gear of second single pinion planetary gear set and a transmission housing.

BRIEF DESCRIPTION OF THE DRAWINGS

For fuller understanding of the nature and objects of the invention, reference should be made to the following detailed description taken in conjunction with the accompanying drawings in which:

FIG. 2 is an actuation table of friction elements for operating a power train according to the present invention.

DETAILED DESCRIPTION OF THE INVENTION

Figure 1:
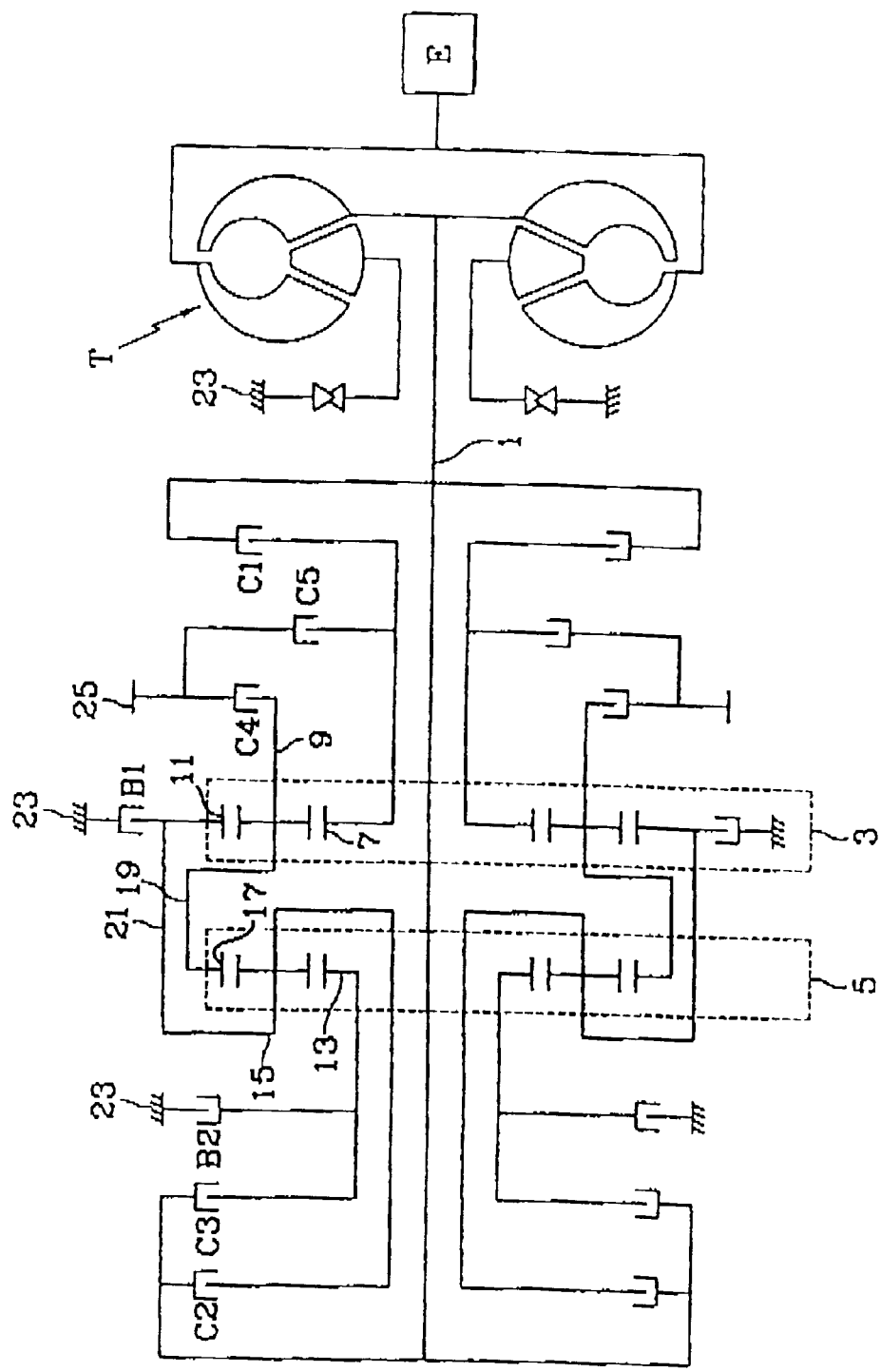
FIG. 1 is a structural drawing of a power train according to the present invention.

FIG. 1 is a structural drawing of a power train according to the present invention, where rotating power of an engine (E) is converted to a torque at a torque converter (T) to be transferred to an input axle 1 of the transmission.

In the present embodiment, the input axle 1 transfers a torque from a turbine of the torque converter (T) to a first single pinion planetary gear set 3 and second single pinion planetary gear set 5, where power may be output through a transfer drive gear 25 variably connected to a sun gear 7 of the first single pinion planetary gear set 3 and a planetary carrier 9 according to mutually-complementing action of the first and second single pinion planetary gear sets 3 and 5, thereby realizing a clutch hook-up.

Furthermore, the planetary carrier 9 at the first single pinion planetary gear set 3 is directly connected through a ring gear 17 of the second single pinion planetary gear set 5 and a power transmission member 19, and a ring gear 11 at the first single pinion planetary gear set 3 is directly connected via a planetary carrier 15 of the second single pinion planetary gear set 5 and a power transmission member 21 to thereby transfer a mutually rotating power.

Input means for inputting a rotating power of the input axle 1 to the combined planetary gear set thus constructed comprises a first clutch (C1) mounted between the input axle 1 and the sun gear 7 of the first single pinion planetary gear set 3 to variably connect same, such that the sun gear 7 is actuated as an input element at first, second, and third forward speeds (D1, D2 and D3).

Between the input axle 1 and the planetary carrier 15 of the second single planetary gear set 5, there is arranged a second clutch (C2) to allow the planetary carrier 15 to act as an input element at third, fourth and fifth forward speeds (D3, D4 and D5), and between the input axle 1 and a sun gear 13 of the second single pinion planetary gear set 5, there is provided a third clutch (C3) to allow the sun gear 13 to act as an input element at a reverse shift stage (R).

Furthermore, a fourth clutch (C4) is mounted between the planetary carrier 9 of the first single pinion planetary gear set 3 and the transfer drive gear 25 to cause the planetary carrier 9 to act as an output element at the first, second, third and fourth forward speeds and the reverse shift stage (R), such that the rotating power input from the input axle 1 can be shifted to thereby be output through the planetary carrier 9 of the first single pinion planetary gear set 3 and the sun gear 7, and between the sun gear 7 and the transfer drive gear 25, there is provided a fifth clutch (C5) to make the sun gear 7 act as an output element at the fifth forward speed. The first, second, third, fourth and fifth clutches may use a clutch with multiple laminated disc generally utilized in the conventional automatic transmission. Furthermore, brakes are provided to adjust revolution of an output relative to an input.

A first brake (B1) formed at the brake is so arranged between a ring gear 11 of the first single pinion planetary gear set 3 and transmission housing 23 as to simultaneously select as a reaction force element the ring gear 11 and the planetary carrier 15 of the second single pinion planetary gear set 5 at the first forward speed and reverse shift stage (R).

A second brake (B2) is equipped between a sun gear 13 of the second single pinion planetary gear set 5 and the transmission housing 23 to select the sun gear 13 as a reaction force element at the second, fourth and fifth forward speeds.

It should be noted that a construction is omitted in FIG. 1, where the transfer drive gear 25 at the power train is meshed with a transfer driven gear (not shown) to transfer power to a differential gear via a final decelerating gear, and well-known construction may be used, together with other constructions to accomplish objects of the present invention, such that description thereto is omitted herefrom.

The power train of automatic transmission according to the present invention thus described selects as an input element any one of the three elements (sun gear, planetary carrier and ring gear) at the planetary gear set according to actuation and deactivation of friction elements (input and output means, and brake means) where actuation and deactivation are selected by a transmission control unit (not shown), and selects as a reaction force element the other elements, thereby outputting a transmission ratio of five forward speeds and one reverse speed described below.

FIG. 2 shows an actuation table of friction elements where actuation and deactuation are selected by the transmission control unit.

When a selector lever (not shown) selects a forward drive (D) range to start increasing an openness of a throttle valve, the transmission control unit supplies hydraulic pressure to the first, fourth clutches (C1 and C4) and first brake (B1) via a hydraulic control system (not shown) in order for the power train to output a transmission ratio of a first speed.

The meaning below saying that a clutch or a brake is actuated defines that hydraulic pressure is supplied from a hydraulic control system.

At this time, an input is initiated by the first clutch (C1) via the sun gear 7 at the first single pinion planetary gear set 3, the ring gear 11 at the first single pinion planetary gear set 3, along with planetary carrier 15 at the second single pinion planetary gear set 5 integrally connected thereto, is acted as a reaction force element by actuation of the first brake (B1), and under this state, an outputer is initiated by the fourth clutch (C4) at the first single pinion planetary gear set 3 and ring gear 17 at the second single pinion planetary gear set integrally connected thereto.

The planetary carrier 9 at the first single pinion planetary gear set 3 as an output element is rotated in the same direction as the input axle 1 by this action, to thereby output the largest deceleration ratio provideable by the power train according to the present invention, such that a shift stage of the first speed is initiated.

When a vehicle speed is increased in the first speed control state, the transmission control unit releases the actuation of the first brake (B1) under the first speed state and simultaneously actuates the second brake 24.

Successively, an input is realized by the first clutch (C1) via the sun gear 7 at the first single pinion planetary gear set 3 while the sun gear 13 at the second single pinion planetary gear set 5 is acted as reaction force by the operation of the second brake (B2).

Under this state, an output is realized by the fourth clutch (C4) along with the planetary carrier 9 at the first single pinion planetary gear set 3 integratally connected to the ring gear 17 of the second single pinion planetary gear set 5.

Successively, the planetary carrier 9 of the first single pinion planetary gear set 3 is rotated as an output element in the same direction as that of the input axle 2 to output a faster transmission ratio of second speed than that of the first speed.

When the vehicle speed is increased under this control state of second speed, the transmission control unit releases the actuation of the second brake (B2) to newly actuate the second clutch (C2), such that an input from the input axle 1 is simultaneously transmitted to the sun gear 7 of the first single pinion planetary gear set 3 and to the planetary carrier 15 of the second single pinion planetary gear set 5.

Successively, same input is transmitted to the ring gear 11 of the first single pinion planetary gear set fixedly connected to the planetary carrier 15 of the second single pinion planetary gear set 5, and by this operation, the first single pinion planetary gear set 3 maintains rotation in directly-connected state and again transmits the same input to the ring gear 17 of the second single pinion planetary gear set 5 fixedly connected to the planetary carrier 9 of the first single pinion planetary gear set 3, where the combined planetary gear set outputs a third speed transmission ratio having the same input and output.

When a vehicle speed is further increased in a third speed state thus described, the transmission control unit releases actuation of the first clutch (C1) in the third speed state to thereby actuate the second brake (B2).

Successively, the input via the sun gear 7 of the first single pinion planetary gear set 3 is blocked by the first clutch (C1) while an input is initiated only through the planetary carrier 15 of the second single pinion planetary gear set 5 by the second clutch (C2).

The sun gear 13 at the second single pinion planetary gear set 5 is actuated as reaction force element by actuation of the second brake (B2), and the planetary carrier 9 of the first single pinion planetary gear set 3 outputs power of the engine along with the ring gear 17 of the second single pinion planetary gear set 5 integrally connected thereto by way of the fourth clutch (C4).

Successively, the planetary carrier 9 of the first single pinion planetary gear set 3 is rotated in the same direction as the input axle 1 as output element to increase speed, such that a fourth speed transmission ratio faster than that of the third speed is output.

When a vehicle speed in the fourth speed state is increased, the transmission control unit releases the actuation of the fourth clutch (C4) in the fourth speed state to newly actuate the fifth clutch (C5).

By this operation, an input is realized by the second clutch (C2) via the planetary carrier 15 of the second single pinion planetary gear set 5 and the sun gear 13 at the second single pinion planetary gear set 5 is actuated as reaction force element by the actuation of the second brake (B2), such that output is realized by the fifth clutch (C5) under this state to the sun gear 7 of the first single pinion planetary gear set 3.

Successively, the sun gear 7 of the first single pinion planetary gear set 3 as output element is rotated in the same direction as that of the input axle 1, such that a faster fifth speed transmission ratio than that of the fourth speed is output. In other words, the fourth and fifth speeds maintain over drive state.

Furthermore, when the selector lever selects the reverse (R) range, the transmission control unit actuates the third and fourth clutches (C4 and C4) and the first brake (B1). By this operation, an input is realized by the third clutch (C3) through the sun gear 13 of the second single pinion planetary gear set 5, and the ring gear 11 of the first single pinion planetary gear set 3 is actuated as reaction force element along with the planetary carrier 15 of the second single pinion planetary gear set 5 fixedly connected thereto, whereby, an output is realized by the fourth clutch (C4) in this state to the planetary carrier 9 of the first single pinion planetary gear set 3.

Successively, the planetary carrier 9 of the first single pinion planetary gear set 3 as output element is reversely rotated relative to the input axle 1 and an output is realized thereby, whereby a reverse transmission ratio is output.

As apparent from the foregoing, there is an advantage in the power train of automatic transmission according to the present invention thus described in that a shift stage comprising forward five speeds and one reverse speed can be realized by two simple planetary gear sets and seven friction elements to thereby enable compactness and lightness of the automatic transmission. Furthermore, there is another advantage in that unnecessary power loss can be minimized at the third forward speed stage according to idle racing.

What is claimed is:

1. A power train of an automatic transmission, the train comprising:
   a combined planetary gear set provided by fixedly connecting a planetary carrier of a first single pinion planetary gear set to a ring gear of a second single pinion planetary gear set, and by fixedly connecting a ring gear of the first single pinion planetary gear set to a planetary carrier of the second single pinion planetary gear set;
   three input means for causing an input to be variably initiated to any of three actuating elements of various actuating elements of the combined planetary gear set;
   two output means for causing an output to be variably initiated from any of two actuating elements out of various actuating elements of the first single pinion planetary gear set; and
   two brakes actuating reaction forces between the respective gear sets and a transmission housing.

2. The power train as defined in claim 1, wherein the three input means comprise:
   a first clutch mounted between a sun gear of the first single pinion planetary gear set and an input axle to variably connect same;
   a second clutch mounted between the planetary carrier of the second single pinion planetary gear set and the input axle to variably connect same; and
   a third clutch mounted between a sun gear of the second single pinion planetary gear set and the input axle to variably connect same.

3. The power train as defined in claim 2, wherein the two output means comprise:
   a fourth clutch for being mounted between the planetary carrier of the first single pinion planetary gear set and a transfer drive gear to variably connect same; and
   a fifth clutch for being mounted between a sun gear of the first single pinion planetary gear set and the transfer drive gear to variably connect same.

4. The power train as defined in claim 2, wherein the two brakes comprise:
   a first brake for selecting the ring gear as an reaction force element between the ring gear of the first single pinion planetary gear set and a transmission housing; and
   a second brake for selecting a sun gear as a reaction force element between the sun gear of the second single pinion planetary gear set and the transmission housing.

* * * * *